United States Patent

[11] 3,532,027

| [72] | Inventors | Stanley I. MacDuff;<br>Richard L. Lewis, South Bend, Indiana |
|---|---|---|
| [21] | Appl. No. | 794,472 |
| [22] | Filed | Jan. 15, 1969 |
| [45] | Patented | Oct. 6, 1970 |
| [73] | Assignee | The Bendix Corporation<br>a corporation of Delaware |

[54] HYDRAULIC BOOST PRESSURE CONTROL DEVICE
7 Claims, 3 Drawing Figs.

[52] U.S. Cl. .................................................. 91/371,
91/372, 91/378, 91/451
[51] Int. Cl. .................................................... F15b 9/10,
F15b 13/042
[50] Field of Search .......................................... 91/370,
371, 372, 373, 378 (Cursory), 434, 433,
451 (Cursory), 452 (Cursory)

[56] References Cited
UNITED STATES PATENTS

| 2,064,379 | 12/1936 | Kundig ................... | 91/434 |
| 2,410,269 | 10/1946 | Chouings ................ | 91/372 |
| 3,133,473 | 5/1964 | Garrison et al. ......... | 91/372 |

Primary Examiner—Paul E. Maslousky
Attorney—Richard G. Geib

ABSTRACT: This invention relates to a hydraulic brake booster device having an open-center hydraulic control valve designed to operate in a system supplied with fluid power from at least one pump and including other components such as a hydraulic power steering gear. The booster incorporates a control valve having a pilot relief valve therewithin to limit its pressure to a predetermined level slightly below maximum system pressure in order to prevent completely blocking of flow to the power steering gear and other components of the system.

Patented Oct. 6, 1970
3,532,027
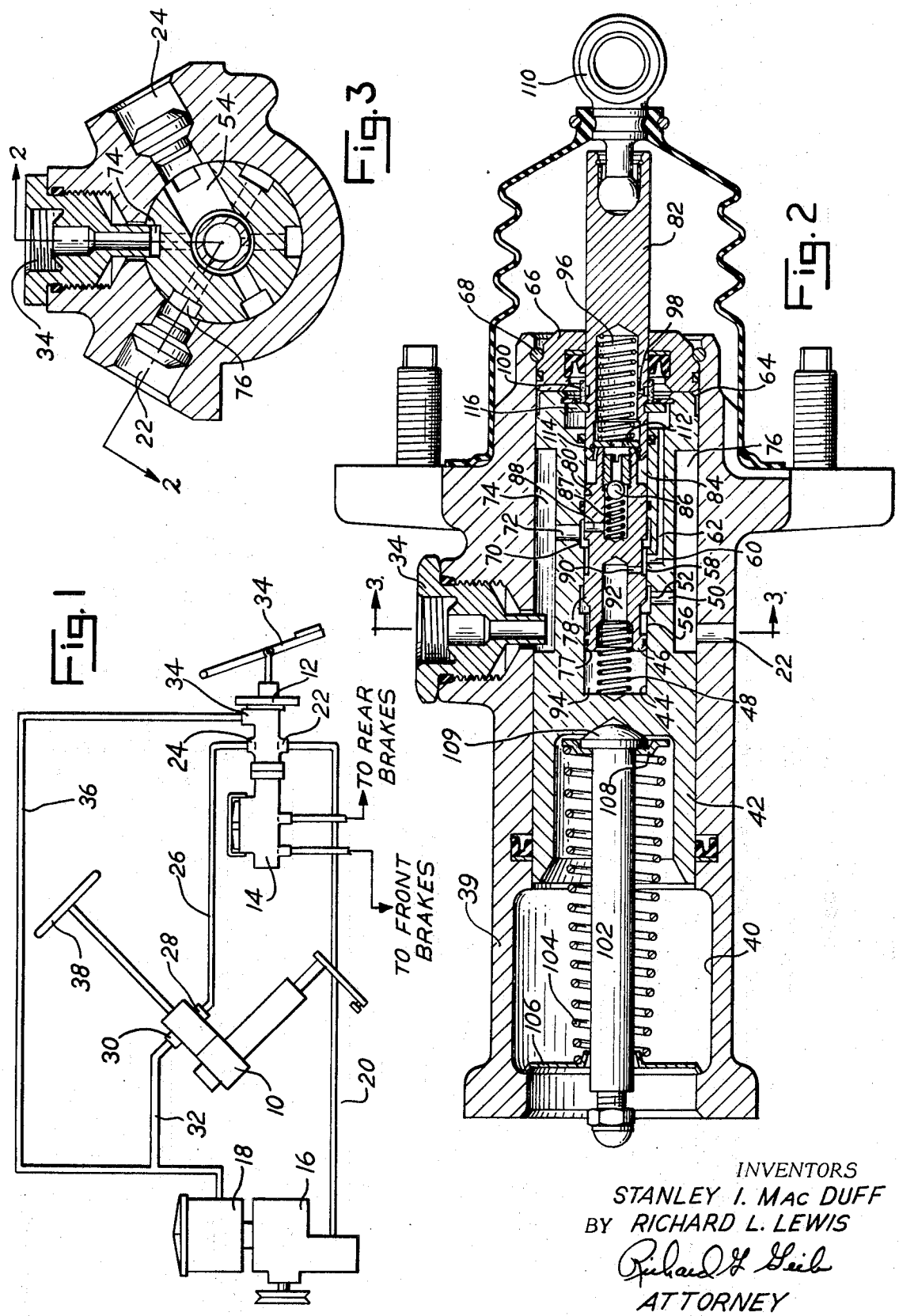
INVENTORS
STANLEY I. MAC DUFF
BY RICHARD L. LEWIS
Richard F. Geib
ATTORNEY

HYDRAULIC BOOST PRESSURE CONTROL DEVICE

SUMMARY

Some prior art devices have involved boost mechanisms of a pressure sharing rather than a flow sharing arrangement. Such systems require either a pump having greater pressure capability or else the force capability of companion components must be degraded in proportion to the pressure allotted to the control means of this invention. Alternately, the components must be increased in size, which would also require an increase in pump flow in order to maintain response times at the same level.

In power boost braking systems constructed in accordance with the invention of R. Lewis and L. Larsen shown in U.S. Pat. No. 3,119,235 assigned to the common assignee, the braking system can utilize a large portion of the pressure available to the steering gear. In actual practice if the power steering system is provided with a relief valve setting of 1,100 p.s.i., the brake booster may be designed to operate at pressures up to 1,000 p.s.i. In a pressure sharing system the maximum braking system pressure might be limited to 300 p.s.i. It is obvious that the booster piston area of Lewis and Larsen's invention would be less than one-third that of a pressure sharing unit if identical forces were to be exerted on the brake master cylinder. With this in mind, it should be observed that the limiting hydraulic response time of the hydraulic brake booster is a direct function of pump flow and piston area. Therefore, a hydraulic brake booster of this flow sharing type will utilize substantially maximum system pressure and reduce the fundamental response time for the same pump flow in the system by approximately one-third. In order to insure that the braking pressure would be suitably limited and to avoid the possibility of shutting off the flow of fluid through the booster brake valve to the power steering valve with consequent loss of the power steering function, as a principal object for this invention, a pilot relief valve is incorporated in the brake booster valving.

A specific object of this invention is to incorporate a pilot relief valve in the control valve of such a booster whereby an extremely small flow through an orifice drilled in the sidewall of the actuating plunger creates a pressure differential across the control valve plunger enabling it to perform the additional function of a main relief valve.

A further detailed object of this invention is to provide such a pilot valve as aforementioned which will enable the control valve within the hydraulic boost piston to perform the major relief valve function under the control of the pilot valve so that the maximum pressure difference developed by the brake booster can be limited to predetermined values less than the power steering system pump relief valve setting.

DRAWING DESCRIPTION

Other objects and advantages will certainly appear to those skilled in the art to which this invention relates from the following description of the drawings in which:

FIG. 1 is a schematic illustration of a hydraulic system such as is found in today's automobiles incorporating a control valve for providing hydraulic boost for vehicle braking in accordance with the principles of this invention;

FIG. 2 is a cross-sectional view of a control valve made pursuant to our present invention taken substantially along lines 2-2 of FIG. 3; and FIG. 3 is a cross-sectional view taken substantially along lines 3-3 of FIG. 2.

With reference now to FIG. 1 there is shown a vehicle hydraulic system for providing pressure boost to a power steering mechanism 10 and a brake booster 12 operating a brake master cylinder 14. The system includes a pump mechanism 16 receiving fluid from a reservoir 18 and delivering it through a conduit 20 to an inlet port 22 of the brake booster 12. This fluid is conducted by internal provisions, discussed hereinafter, to a flowthrough port 24 and by a conduit 26 to a power steering control valve inlet 28. It leaves the valve 28 through a port 30 by a conduit 32 leading back to reservoir 18. In addition, the booster 12 is provided with a return port 34 to which a conduit 36 leading to reservoir 18 is connected. The system is completed by providing manual or operator control elements 38 and 34 for the steering and braking systems, respectively.

With reference now to FIG. 2, control valve 12 is shown in detail to comprise a housing or body 39 having a bore or chamber 40 within which a piston 42 is reciprocally mounted. Piston 42 is provided with a bore 44 for receiving a spool type control valve plunger 46. Valve plunger 46 is normally urged to the right, as seen in FIG. 2, by means of a spring 48 so as to communicate a radial passage 50 located centrally of a groove 52 to radial passage 54 (see FIG. 3) leading from a land 56 to the left of the groove 52. Another land 58 is provided in the walls of the bore 44 to the right of the groove 52. This land 58 is provided with a radial passage 60 communicating with an axial passage 62 opening into a control chamber portion 64 between the piston 42 and a plug 66 held to the housing 39 in the right end of the bore 40 by means of a retainer ring 68. Beyond the land 58, i.e., to the right as seen in FIG. 2, another groove 70 is provided in the bore 44 of piston 42. A radial passage 72 located centrally of the groove 70 leading to a slot 74 in the sidewalls of piston 42 communicates fluid to return port 34. A similar slot 76 (see FIG. 3) communicates port 22 and radial passage 50.

Spool valve 46 is provided with lands 77, 78 and 80 separated by suitable grooves to cooperate with the lands and grooves in the walls of the bore 44 to permit in the order listed, upon movement of valve 46; the closing of communication of passage 60 with passage 72, the opening of communication of passage 50 and passage 60, and the restriction of communication between passage 50 and passage 54. This motion is permitted by means of actuator push rod 82 which is sealingly projectable into bore 44 to segregate a first chamber 84 ahead of the valve 46; i.e., between valve 46 and actuator 82 within piston 42. Valve 42 is provided with a counterbore in which a spring biased ball valve 86 is located to normally prevent communication of chamber 84 with a radial passage 88 in the body of valve 46. Passage 88 is so located on its land 80 as to be opened to passage 72 for permitting return flow to port 34 whenever valve 86 is opened. Valve 86 is normally biased by the spring 87 to pop open at a pressure below that required to open the relief valve in pump 16.

In addition, valve 46 is provided with another radial passage 90 in its body which communicates with a bore 92 leading to a second segregated chamber 94 at the other end of valve 46 so as to permit pressure from chamber 64 to be communicable with the left end of valve 46, normally providing a balance of forces thereon. Operator feel is provided by force on actuator 82 due to pressure in chamber portion 64 which is communicated to chamber 84 through a restricted passage 98.

Actuator rod 82 is drilled to receive a spring 96 held in a preloaded condition by an annular plate 112 positioned by snap ring 114. This insures that movement of actuator 82 will cause movement of valve 46. A filter means 100 is affixed to actuator 82 over orifice 98 to prevent blocking of the orifice.

The construction of the booster 12 is completed by attaching a force transmitting rod 102 to the piston 42 and placing a return spring 104 between a spring bearing plate 106 and a plate 108 on a head 109 for the force transmitting rod 102. The spring will thus maintain rod 102 abutting piston 42, and supplement the return springs in master cylinder 14 returning piston 42 to its rest position. Brake pedal 34 is connected via eyelet 110 to actuating rod 82.

OPERATION

Fluid flow in the device disclosed by this invention is basically the same as in previous open-center brake valve designs except that control pressure is communicated through radial passage 60 to axial passage 62 to the control chamber portion 64 of bore or chamber 40 for booster 12. This control fluid provides the pressure to displace the piston 42 axially, which, in turn, actuates master cylinder 14 bolted to the end of the hydraulic booster 12.

From chamber 64 the control fluid pressure will flow through filter 100 through the orifice 98 to the chamber 84. Therefore, the pressure suspension of spool valve 46 is such as to normally balance said valve 46. As ball valve 86 opens at a pressure below system relief pressure of pump 16, this pressure balancing is insured up to maximum boost pressure for piston 42; i.e., as pressure in chamber 84 rises to the level of the maximum boost pressure for chamber 64, valve 86 will open to permit pressure to relieve on the right of valve 46. The pressure in chamber 94, being equal to that in control chamber 64, will then move valve 46 to the right until ball 86 is again closed and pressure in chamber 84 is effective to halt the movement. This action will always maintain maximum flow to port 24 by preventing closure of lands 78 and 56 while positioning lands 78 and 58 to maintain maximum boost pressure for chamber portion 64, when called for.

Due to the abutting relationship of valve 46 and actuator 82 being by means of the plate 112 retained by a snap ring 114 to cage spring 96 in a bore of actuator 92, the aforesaid positioning of valve 46 can take place even though the operator has pushed on pedal 34 to cause abutment of stop ring 116 of actuator 82 on piston 42. Therefore, even in manual override of piston 42 the power steering capability is not impaired by system pressure relieved.

During power boost operation the hydraulic pressure in chamber 64 is effective on actuator 82 to provide feel of operation for the operator of brake pedal 34. In operation, this valve has a well graduated progression of feel throughout the range of boost operation.

We claim:

1. A control valve for a hydraulic boost, said control valve comprising:
    a housing having a chamber therewithin with a pressure inlet port, a flow through port and a return port;
    a piston in said chamber having a bore with first and second passage means communicable therewith porting said inlet port to a control chamber portion at one end of said piston and communicating said control chamber portion to a first valve seat provided in the walls of said bore spaced from a second valve seat to which a third passage means is provided leading to said flow through port intermediate which a fourth passage means is provided and connected to said inlet port, said walls being further provisioned ahead of said first valve seat with a fifth passage means leading to said return port;
    a valve in said bore with spaced valve faces for cooperation with said valve seats to monitor fluid flow between said inlet port and said return port via said control chamber portion to thereby control positioning of said piston, said valve having first and second means with said first means permitting control pressure to react on said valve to provide valve followup and operator feel and said second means communicates said control chamber portion with said fifth passage means in all positions of said valve; and
    flow control valve means in said second means of said valve permitting utilization of near maximum system pressures to control said piston whereby piston size can be limited.

2. The structure of claim 1 wherein said flow control valve means includes an orificed passage upstream of a spring biased element downstream of which is provided a passage open to said fifth passage.

3. A control valve for a hydraulic booster comprising:
    a body member having a first generally cylindrical chamber therein;
    a piston having a second generally cylindrical chamber therein, said piston being mounted for reciprocatory movement in said first cylindrical chamber;
    a slide valve mounted for reciprocatory movement in said second cylindrical chamber, said slide valve and chamber having spaced complimentary land-and-groove portions defining therebetween, an exhaust port means, a pressure port means and flowthrough port means, said spaced complementary land-and-groove portions being proportioned to effect sequentially upon relative movement between said slide valve and said second chamber a closing of said exhaust port means, a restriction of communication between said pressure port means and said flowthrough port means to effect modulation of pressure provided from said pressure port means;
    control port means disposed between said exhaust port means and pressure port means and having fluid connections with said exhaust port means in the normal position of said slide valve in said second chamber and with said pressure port means at operating positions of said slide valve in said second chamber to receive said modulated pressure or back pressure from said feed port means, said control port means being open to a variable volume portion of said first chamber at one end of said piston whereby said modulated or back pressure is reactive on said piston to cause it to follow up said valve movements; and
    an operator-operated means connected to said valve, said operator-operated means prescribing with said valve a first segregated portion for said second chamber in said piston which is communicated to said variable volume portion by an orifice means to permit a slow build of pressure in said variable volume portion on said slide valve.

4. The structure of claim 3 wherein said valve includes a passage means to direct pressure in said variable volume portion to a second segregated portion of said second chamber to provide valve positioning regardless of said operator-operated means.

5. The structure of claim 3 wherein said slide valve includes a pressure responsive poppet valve between said first segregated portion and a passage means leading to said return port means to control the pressure differential across said valve to a predetermined level without creating a fluid flow penalty.

6. The structure of claim 4 wherein said slide valve includes a pressure responsive poppet valve between said first segregated portion and a passage means leading to said return port means to control the pressure differential across said valve to a predetermined level without creating a fluid flow penalty.

7. In a series parallel hydraulic system employing a pump, a hydraulic booster and a hydraulic device between the pump and a fluid reservoir, an operator-operated control valve for the booster to regulate boost pressure and maintain hydraulic fluid flow to the device, said control valve comprising:
    a valve actuator having a bore at one end with an orifice through the sidewall thereof;
    a spring in said bore and caged by an annular plate means held adjacent the end of said bore;
    a slide valve telescopically received in said bore and abutting said plate, which slide valve is reciprocally mounted so as to be suspended between hydraulic control pressure on one end and the pressure admitted at the other end by the orifice in said actuator, said slide valve having an axial bore and a radial passage communicable with a return flow means from the booster to the reservoir; and
    a pilot relief valve in said axial passage adapted to relieve the pressure admitted by the orifice at a level below system relief pressure whereby flowthrough means of said slide valve cannot be impaired.

75